Sept. 13, 1932.    O. RENSONNET    1,877,428
MOTOR VEHICLE STEERING SIGHT
Original Filed Dec. 26, 1929
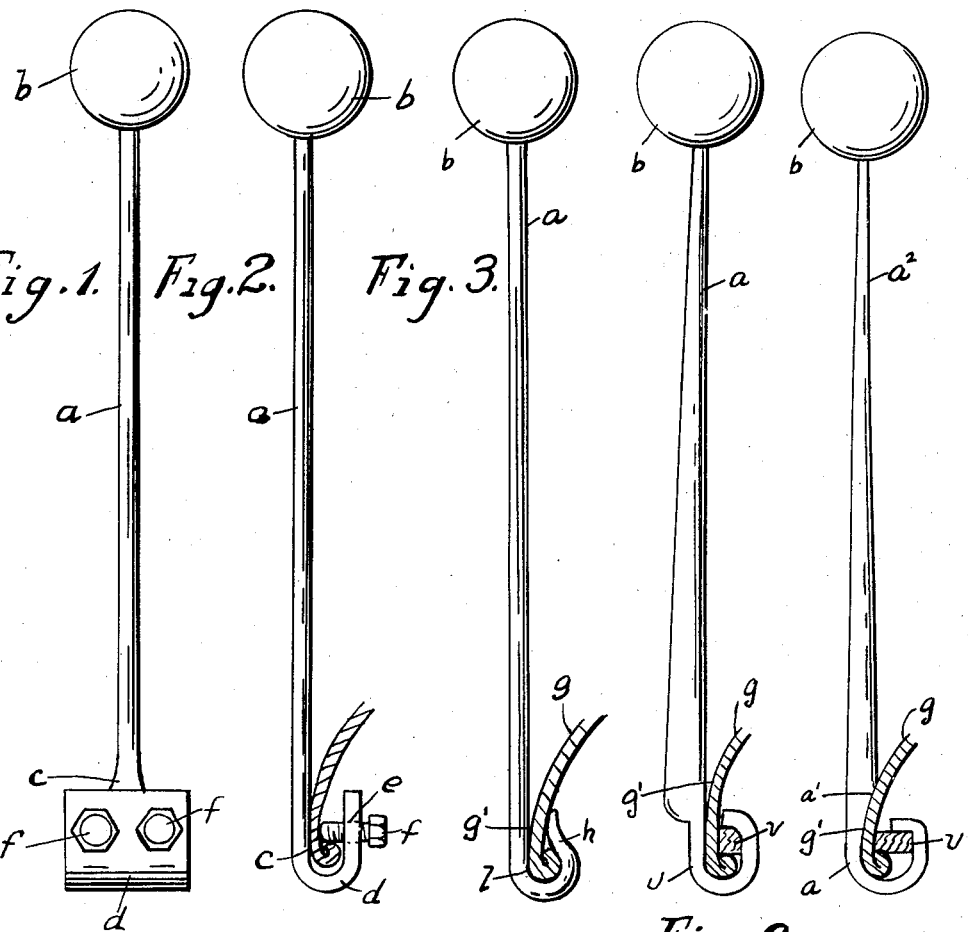
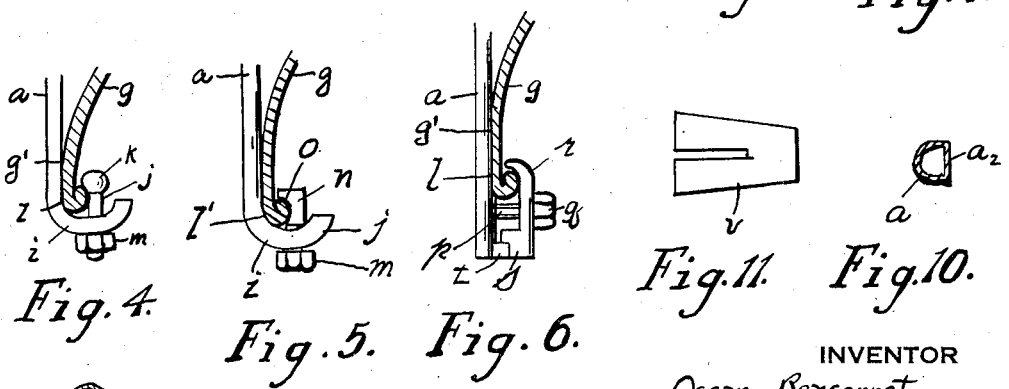
INVENTOR
Oscar Rensonnet
BY HIS ATTORNEY
Howard P. Kane Patented Sept. 13, 1932

1,877,428

UNITED STATES PATENT OFFICE

OSCAR RENSONNET, OF ETTERBEEK-BRUSSELS, BELGIUM, ASSIGNOR TO HENRY DUJARDIN, OF NEW YORK, N. Y.

MOTOR VEHICLE STEERING SIGHT

Original application filed December 26, 1929, Serial No. 416,720, and in Belgium February 11, 1929. Divided and this application filed December 8, 1930. Serial No. 500,899.

Applications for patent have been made in the following countries: Belgium, February 11th, 1929, June 8th, 1929, November 16th, 1929; Great Britain, November 7th, 1929; Canada, January 1st, 1930.

This application is a division of my application Serial Number 416,720 filed Dec. 26, 1929, and relates to a device adapted for use as steering sight or designed to indicate the location of the mudguards in a motor vehicle.

According to the present invention, the aforesaid device comprises a rod or arm carrying at its upper end a sight or aimer and having its bottom portion preferably curved to form a hook and adapted to engage the wing of the mudguard by merely pinching or by means of suitable clamping devices.

By simple way of example, several embodiments of the invention will be hereinafter described with reference to the accompanying drawing in which:

Fig. 1 is an elevation of a steering sight or aimer according to the present invention, Fig. 2 is a side view showing the device as being fixed to the wing of a mudguard, Figs. 3 to 11 are modifications and detail views.

As shown in Fig. 1, $a$ indicates the rod carrying the usual sight or aimer $b$.

The rod or sight carrier $a$ provided at its bottom with a flattened portion $c$ curved to form a hook $d$ and provided with tapped holes $e$ adapted to receive screws $f$ or the like.

As shown in Fig. 2, the reinforced edge $g'$ of the wing $g$ of the mudguard is engaged by the curved portion $d$ of the rod and suitably clamped by the screws $f$.

As shown in Fig. 4 the rod $a$ terminates by a curved portion $i$ carrying a bolt $j$ having a head $k$ which may be pressed against the bead $l$ of the edge of the wing $b$ by screwing a nut $m$ bearing against the curved portion $i$, thus suitably clamping the rod $a$ against the edge $g'$ of the wing.

In the embodiment shown in Fig. 5 the bolt $j$ instead of carrying a head $k$ is provided with a block or body $n$ recessed at $o$ so as to embrace the outline of bead $l$.

According to the modification shown in Fig. 6, the rod $a$ is provided at its bottom end with a screw bolt $p$ passing across a removable clamp $r$ having its lower end provided with a stop $s$ the head $q$ of the screw bolt $p$ applying and pressing the said clamp against a corresponding end stop $t$ integral with the rod $a$ and against the bead $l$ and, eventually the edge $g'$ of the wing of the mudguard.

According to the embodiments shown in Figs. 7 and 9, the rod carrying the sight may be tapered (Fig. 7) or formed with a flattened side portion, as shown in Fig. 10.

In these embodiments the bottom end of the rod $a$ is bent so as to form a hook $u$ engaging the underside of the wing of the mudguard, by means of an interposed, preferably elastical coin, block or wedge $v$ (Fig. 11) adapted to efficiently secure the sight carrier to the mudguard.

It will be understood that besides the embodiments described and shown herein, any other convenient means for securing the device to the mudguard may be employed, such as welding, brazing, riveting, or screwing, while perforation of said mudguard may be involved or not.

Moreover, the device according to the invention may be made of metal or any other convenient or suitable material of appropriate character and strength. The device may likewise be suitably decorated, colored or coated in whole or in part to aid in the visibility of the same. Furthermore, both the shape of the upstanding or stem portion and of the enlargement may be altered from the precise showing herein as will be apparent to those skilled in the art to which this invention appertains, and I do not wish to be understood as limiting myself to the details of construction nor shapes disclosed, except as set forth in the following claims when construed in the light of the prior art.

What I claim is:

1. A steering sight adapted to be fitted to the mudguards of motor vehicles, comprising an upstanding member having a height materially elevating the upper end thereof above the said mudguard, and having means at its lower end for obtaining a gripping engagement with the bead on the said mudguard.

2. A steering sight as claimed in claim 1, wherein the lower end of said upstanding member is curved in the form of a hook so as to obtain engagement with the said bead upon the inner side of the mudguard.

3. A steering sight as claimed in claim 1 wherein a bolt or the like is inserted through the said member as part of the said gripping means.

4. A steering sight as claimed in claim 1, wherein said gripping means provides a bead-engaging member and a bolt or the like for causing said member to grip the bead.

5. A steering sight as claimed in claim 1, wherein the lower end of said upstanding member is curved in the form of a hook, and wherein the said gripping means comprises a threaded device passing through said curved portion and having a head adapted to engage said bead.

6. A steering sight as claimed in claim 1, wherein said gripping means comprises a threaded device having a head providing an overlying shoulder for engagement with said bead.

7. A steering sight as claimed in claim 1, wherein said gripping means comprises a threaded device having a head shaped to obtain more than a line contact with the said bead.

In witness whereof I affix my signature.

OSCAR RENSONNET.